US007039707B2

(12) United States Patent
Hiraiwa et al.

(10) Patent No.: US 7,039,707 B2
(45) Date of Patent: May 2, 2006

(54) DISK SUBSYSTEM, COMPUTER SYSTEM, STORAGE MANAGING METHOD AND PROGRAM

(75) Inventors: Yuri Hiraiwa, Sagamihara (JP); Hirofumi Nagasuka, Sagamihara (JP); Masahiro Kiyoi, deceased, late of Kawasaki (JP); by Keiko Kiyoi, legal representative, Kawasaki (JP); Katsuhisa Miyata, Yokohama (JP); Taketoshi Sakuraba, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 201 days.

(21) Appl. No.: 10/649,671

(22) Filed: Aug. 28, 2003

(65) Prior Publication Data

US 2004/0186899 A1 Sep. 23, 2004

(30) Foreign Application Priority Data

Nov. 5, 2002 (JP) ............................. 2002-320957

(51) Int. Cl.
*G06F 15/173* (2006.01)
*G06F 12/00* (2006.01)

(52) U.S. Cl. ...................... 709/226; 709/220; 707/204; 714/4; 711/112; 711/170; 711/203

(58) Field of Classification Search ................ 711/112, 711/170, 173, 203, 4, 6; 713/100; 709/226; 714/7

See application file for complete search history.

(56) References Cited

U.S. PATENT DOCUMENTS

| 6,477,619 B1 | 11/2002 | Fujimoto et al. |
| 6,735,646 B1 | 5/2004 | Fujibayashi et al. |
| 6,745,281 B1 * | 6/2004 | Saegusa ...................... 711/112 |
| 6,907,498 B1 * | 6/2005 | Kitamura et al. ........... 711/112 |
| 2002/0069320 A1 | 6/2002 | Yagi et al. |
| 2002/0091828 A1 * | 7/2002 | Kitamura et al. ........... 709/226 |
| 2003/0055943 A1 | 3/2003 | Kanai et al. |
| 2003/0135439 A1 | 7/2003 | Yagishita |
| 2003/0163457 A1 | 8/2003 | Yano et al. |
| 2003/0187825 A1 | 10/2003 | Tabata |
| 2003/0220923 A1 | 11/2003 | Curran et al. |
| 2004/0073676 A1 * | 4/2004 | Honma et al. ............... 709/226 |
| 2004/0083401 A1 * | 4/2004 | Furukawa et al. ............. 714/7 |
| 2004/0098537 A1 * | 5/2004 | Serizawa ..................... 711/112 |

FOREIGN PATENT DOCUMENTS

JP 2002-7304 1/2002

* cited by examiner

*Primary Examiner*—Hong Kim
(74) *Attorney, Agent, or Firm*—Mattingly, Stanger, Malur & Brundidge, P.C.

(57) ABSTRACT

When collecting information about management of a storage of a disk subsystem, loads imposed on a host computer and a network are alleviated to improve the throughput of a computer system having the storage. The disk subsystem includes a CPU and a main memory and information on a disk is collected in response to a request from a management computer. An information collection program is operated on the disk subsystem, whereby, volume management information can be edited on the disk subsystem and utilized by the management computer.

7 Claims, 4 Drawing Sheets

VOLUME DESIGNATION INFORMATION

| DISK ID | INFORMATION COLLECTION NECESSITY/ NON-NECESSITY | VOLUME CONFIGURATION ID |
|---|---|---|
| 1 | 1 | 1 |
| 2 | 0 | 5 |

VOLUME CONFIGURATION INFORMATION

| VOLUME CONFIGURATION | HEAD POSITION INFORMATION | UNUSED AREA CAPACITY DESCRIBING POSITION | TOTAL CAPACITY DESCRIBING POSITION |
|---|---|---|---|
| 1 | 4 BYTE | (4 BYTE) | (8 BYTE) |
| 5 | 16 BYTE | 18 BYTE | 24 BYTE |

VOLUME MANAGEMENT INFORMATION EXTRACTED DATA

| DISK ID | UNUSED AREA CAPACITY | TOTAL CAPACITY | ACCESS FREQUENCY |
|---|---|---|---|
| 1 | | | |

501     502     503     504

DISK SUBSYSTEM, COMPUTER SYSTEM, STORAGE MANAGING METHOD AND PROGRAM

BACKGROUND OF THE INVENTION

The present invention relates to storage managing methods and more particularly, to a storage managing method which imposes less loads on a host side computer and a network when management information is collected.

To meet the increase in amounts of data in mission critical systems or key systems of public organizations/enterprises assuming the responsibility of the recent infrastructure, the storage system has coped with the increase in capacity of storage by using a technique for control of disk array. JP-A-2001-256003 discloses such a technique using a disk array.

Also, there has arisen a tendency to establish the key system as above by using a SAN (Storage Area Network) representing a network dedicated to a storage, thereby coping with increased capacity and complexity of the storage. In this type of system, it is desirable that flexible management and expansion of the storage be implemented by connecting a server and the storage by the SAN so as to manage the storage independently of the server. JP-A-2002-7304 discloses a technique concerning a method for managing such a system as using the SAN. By virtue of this known technique, such a storage device as RAID (Redundant Arrays of Inexpensive Disks) or MT (Magnetic Tape) can be worked unitarily or as a single element.

Further, JP-A-2002-175203 discloses a work method directed to load distribution in such a SAN environment that a system has a plurality of servers and a plurality of disk devices are allocated to each of the plurality of servers. This known technique aims at distributing loads or load balancing in accessing the disks and supervising resources for this purpose.

SUMMARY OF THE INVENTION

In the JP-A-2002-175203, when information is collected from a server processing business applications to a management server taking in charge of resource management, the server processing business applications is provided with a program for performing resource supervisory and information about loads imposed on disk volumes is periodically collected from the program. Accordingly, the program for periodical load information collection uses a CPU to impose a load on the CPU for processing of business applications.

As information necessary for unitary work in the SAN environment, information about availability (unused space) of disk, for instance, can be numerated in addition to the access information described in JP-A-2002-175203. In case a method is employed which provides the server with a program for performing resource supervisory with a view to acquiring the information as above, an instruction for acquisition of the information such as unused space information must be issued from the server side to the disks. Accordingly, there is a possibility that an I/O instruction for processing business applications is delayed.

The present invention has been made to solve the above problems and it is an object of the invention to provide a computer system which can alleviate loads imposed on a host computer and a network when information for management of a storage of a disk subsystem is collected, thereby permitting efficient access to the storage.

According to one feature of the invention, a computer system comprises a disk subsystem provided with a CPU, a business service computer for consulting the disk subsystem and a management computer for managing the system, which are mutually connected by a network, wherein an information collecting program (also called "agent") for collecting information about a disk in accordance with a request from the management computer and reporting the collected information runs on the disk subsystem provided with the CPU.

According to a feature of the computer system of the invention, the agent is operated on the disk subsystem, so that information about unused space of the disk can be collected without imposing a load on a computer for processing business applications. In collecting the disk information, the unused space information can be transmitted to the management computer without being routed through the business service computer and as a result, the disk unused space information can be collected without imposing a load on a communication path between that computer and the disk.

Other objects, features and advantages of the invention will become apparent from the following description of the embodiments of the invention taken in conjunction with the accompanying drawings.

BRIEF DESCRIPTION OF THE DRAWINGS

FIG. 3 is a diagrammatic representation of volume designation information 300.

FIG. 4 is a diagrammatic representation of volume configuration information 400.

FIG. 5 is a diagrammatic representation of volume management information extracted data 500.

DESCRIPTION OF THE EMBODIMENTS

The embodiments of the present invention will now be described by way of example with reference to the accompanying drawings.

The present invention is concerned with a storage managing method. Conceivably, various kinds of data are handled for storage management but in particular, the present embodiment will be described on the assumption that data of a disk volume needed by a management program has the contents, three in total, of disk unused area capacity, total capacity and access frequency.

[Configuration of Computer System]

Figure 1:
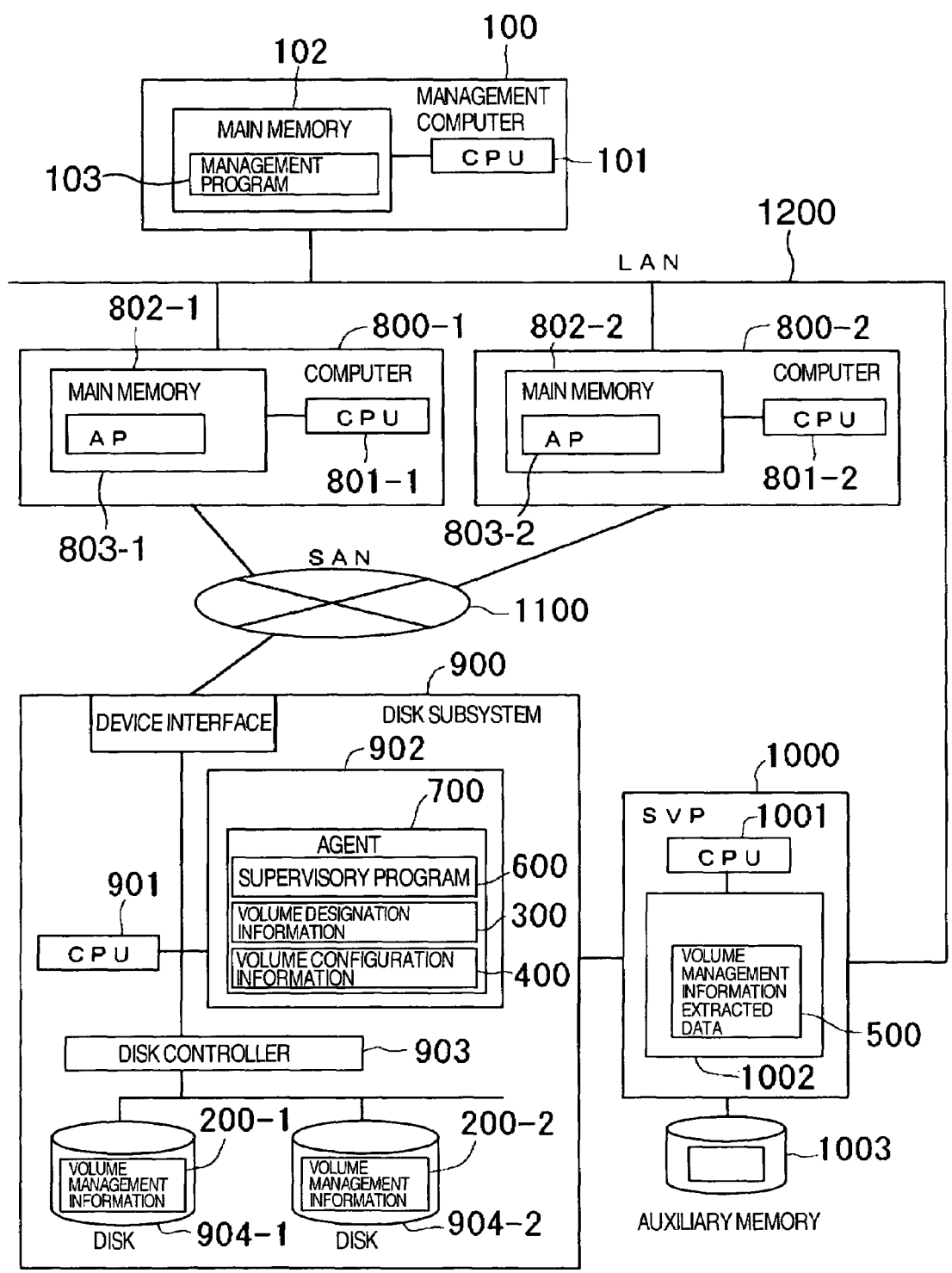
FIG. 1 is a block diagram showing the construction of a computer system according to the invention.

Referring first to FIG. 1, description is made of a computer system according to the embodiment of the invention in configuration.

The present system as shown in FIG. 1 comprises a management computer 100, computers 800 (800-1, 800-2) of objects to be managed and a disk subsystem 900 accessible from the computers. These components are connected to each other through a network. Attached to the disk subsystem 900 is a SVP (Service Processor) 1000 for performing management of disks inside the disk subsystem 900. The computers 800 are connected to the disk subsystem 900 through the medium of a SAN 1100 representing a network dedicated to storage. On the other hand, the management computer 100 is connected to the computers 800 and SVP 1000 through a LAN (Local Area Network) 1200.

An AP (Application Program) 803 (803-1, 803-2) for processing business applications by users is loaded on a main memory 802 (802-1, 802-2) of computer 800 (800-1, 800-2) and executed by means of a CPU 801 ((801-1, 801-2). In order to conduct business affairs, the AP 803 accesses the disk subsystem 900 to read and write data file by file, as necessary.

The disk subsystem 900 incorporates disks 904 (904-1, 904-2) controlled by means of a disk controller 903. The disk 904 may be a virtual disk (logical volume) and each disk may be an array comprised of two or more disks. In the present embodiment, I/O instructions for disks 904 are identified by disk ID's and are allocated as logical volumes in unit of disk to each computer 800, thereby ensuring that collection/management of information can be carried out in unit of disk.

Volume management information 200 (200-1, 200-2) of a format depending on a file system of an allocated computer 800 is stored on the disk 904.

On a main memory 902 of disk subsystem 900, an agent 700 for performing resource supervisory is developed and executed by means of a CPU 901. The agent 700 is a program for collecting management information of the volume installed on the disk subsystem and it includes volume designation information 300 for designating a volume which delivers management information, volume configuration information 400 describing a method for referencing the volume and supervisory program 600. On the basis of the two pieces of volume designation information 300 and volume configuration information 400, the supervisory program 600 delivers the management information to volume management information extracted data (area) 500 located on a main memory 1002 of SVP 1000. Then, in response to a request from the management computer 100, the SVP 1000 transmits the volume management information extracted data 500 through the LAN 1200.

The agent 700 is normally stored in an auxiliary memory 1003 the SVP 1000 has and is developed, as necessary, from the SVP 1000 onto the main memory 902 of disk subsystem 900 so as to be executed.

Even after the development, the volume designation information 300 can be updated from the SVP 1000 to meet a change in configuration of disk 904. A decision as to whether or not the information acquisition is to be carried out can also be changed.

On a main memory 102 of management computer 100, a management program 103 is developed and executed by means of a CPU 101. The management program 103 reads the volume management information extracted data 500 of SVP 1000 to collect the information of the disk subsystem 900.

[Data Structure for Storage Management]

Figure 2:
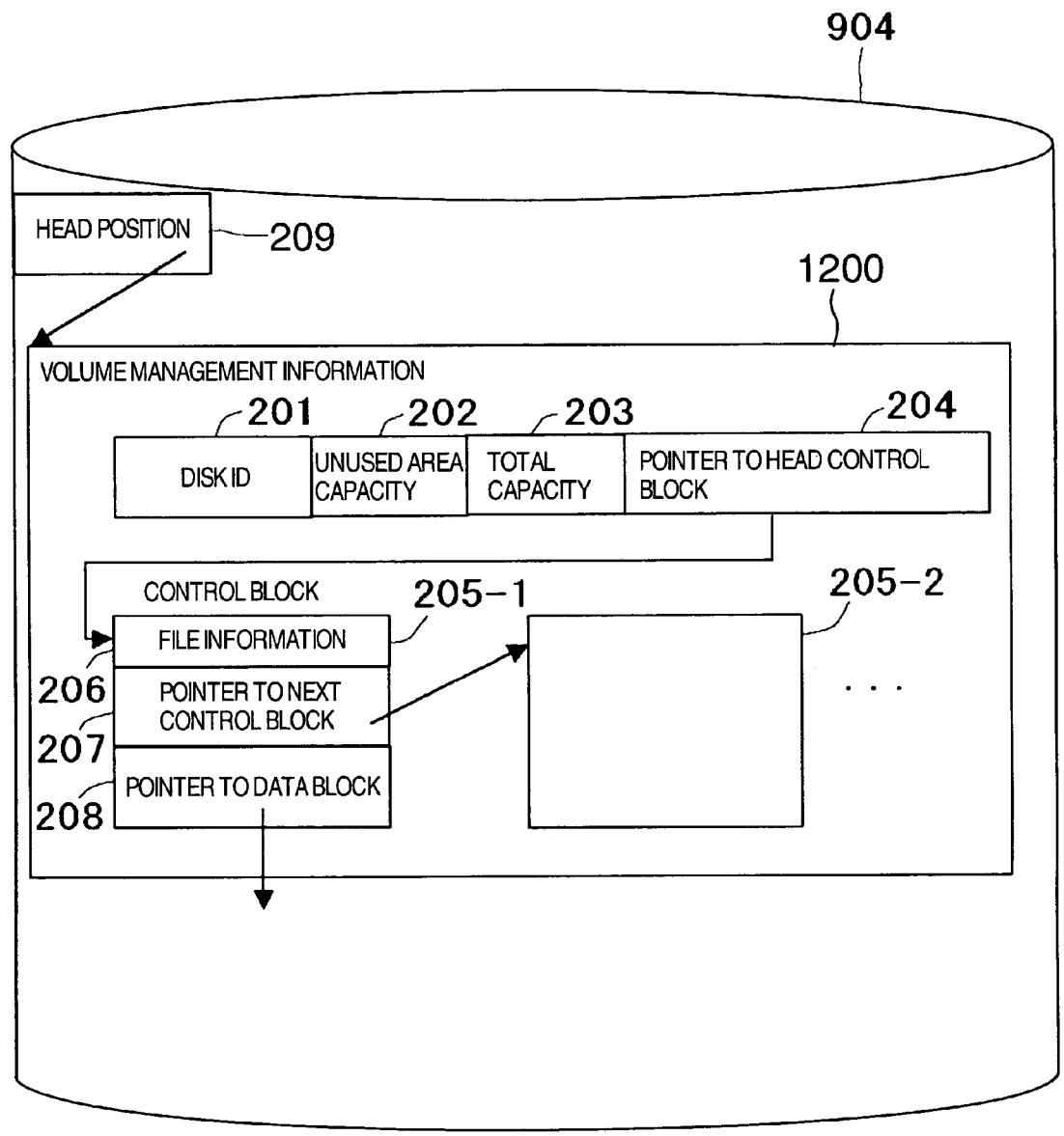
FIG. 2 is a diagram showing the structure of volume management information 200 and the structure of a volume.

Next, a data structure for storage management according to an embodiment of the invention will be described with reference to FIGS. 2 to 5, of which FIG. 2 illustrates volume management information 200 and the structure of a volume, FIG. 3 diagrammatically depicts volume designation information 300, FIG. 4 diagrammatically depicts volume configuration information 400 and FIG. 5 diagrammatically depicts volume management information extracted data 500.

The volume management information 200 is data for managing a volume corresponding thereto and is located on a disk 904 as shown in FIG. 2.

The disk 904 has head position 209 indicative of a start position of the volume management information 200. Disk ID 201 is an area adapted to store an ID for identifying the volume. Unused (area) capacity 202 is an area storing an unused (area) capacity of the volume. Total capacity 203 is an area storing a total capacity of the volume. Pointer 204 to a head control block is an area storing a pointer to the head of a list of control blocks 205 (205-1, 205-2) for managing areas used by files.

The control blocks 205 form a table having a list structure for managing data blocks used by files in the volume and each control table includes file information 206, pointer 207 to next control block and pointer 208 to a data block. The file information 206 is an area adapted to store information for identifying a file using the data block. This information sometimes indicates an unused (or free) status. The pointer 207 to next control block is an area adapted to store a pointer to the next control block 205. The pointer 208 to a data block is an area adapted to store a pointer to a data block in the volume.

The volume designation information 300 describes information for collecting management information of the volume and as shown in FIG. 3, it includes disk ID 301, information collection necessity/non-necessity 302 and volume configuration ID 303.

The disk ID 301 is an area storing ID's for identifying volumes. The information collection necessity/non-necessity 302 is an area storing designation as to whether information collection is to be carried out in respect of a particular volume and in accordance with a value in this area, the supervisory program decides whether management information of the volume is to be collected.

In the present embodiment, it is assumed that the area is described with "1" in the case of execution of collection and with "0" in the case of inexecution of collection. The volume configuration information 400 is an area adapted to store information for indicating information as to which ID of the volume configuration information 400 is used in order to read information from the volume management information 200 of the volume.

The volume configuration information is obtained by extracting information necessary for volume management and as shown in FIG. 4, it includes volume configuration ID 401, head position information 402, unused (area) capacity describing position 403 and total capacity describing position 404.

The volume configuration ID 401 is an area storing an ID for identifying the kind of volume configuration and is linked with the volume configuration ID of volume designation information of FIG. 3.

The head position information 402 is described with information as to which location in the volume the head position 209 representing the area storing the head position of volume management information 200 is located at. The unused (area) capacity describing position 403 is an area storing a position of the unused (area) capacity 202 in the volume management information 200. The total capacity describing position 404 is an area storing a position of the total capacity 203 in the volume management information 200.

When in the notation of the present embodiment the unused (area) capacity describing position 403 and total capacity describing position 404 are so described as to be parenthesized, a difference from the head of volume management information 200 obtained from the head position information 402 is indicated but when not parenthesized, they are so described as to indicate positions in the volume.

The volume management information extracted data 500 is information for the SVP 1000 to hold volume management information of a necessary volume and as shown in FIG. 5, and it includes disk ID 501, unused (area) capacity 502, total capacity 503 and access frequency 504.

The disk ID 501 is an area storing an ID for identifying a volume. The unused (area) capacity 502 is an area storing an unused (area) capacity of a disk ID 501 acquired by the supervisory program 600. The total capacity 503 is an area storing a total capacity of the disk ID 501 acquired by the supervisory program 600. The access frequency 504 is an area storing a frequency of access to a volume of the disk ID 501 acquired by the supervisory program 600.

[Process of Supervisory Program]

Figure 6:
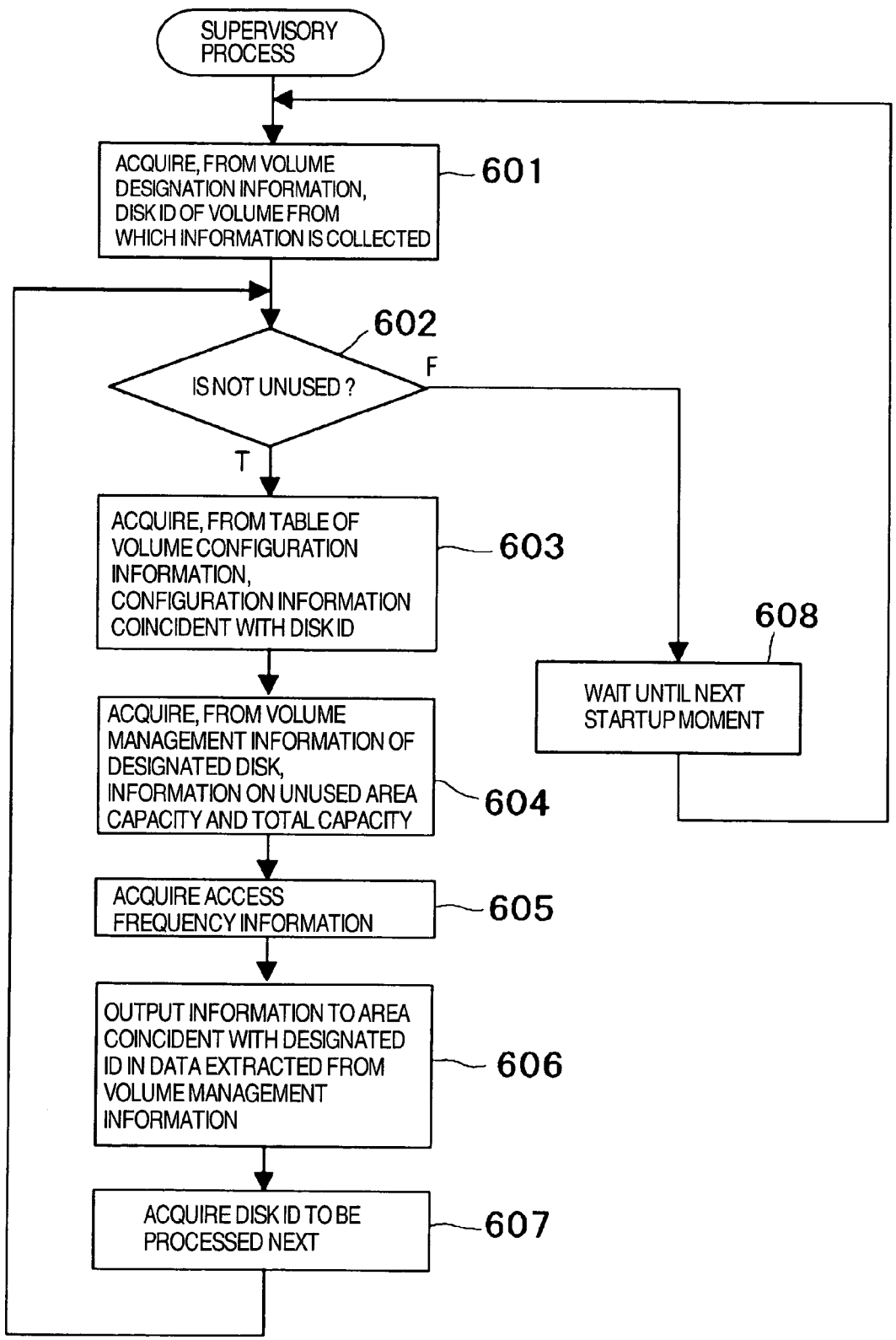
FIG. 6 is a flowchart showing the flow of a process of supervisory program 600.

The flow of a process of supervisory program 600 will now be described by making reference to FIG. 6 showing a flowchart of the process flow.

Firstly, the supervisory program acquires from the volume designation information 300 a disk ID 301 for which the information collection necessity/non-necessity 302 is "1" (step 601).

Then, it is decided whether the disk ID 301 acquired in the step 601 is not unused, that is, whether a disk from which information is collected exists (step 602).

When the disk from which information is collected is present, a volume configuration ID 303 corresponding to the disk ID 301 is acquired (step 603) but in the absence of the disk from which information is collected, one round of the process of supervisory program is determined to be ended and the next startup moment is waited for (step 608).

When the disk from which information is collected is present and the step 603 is executed, information is acquired from the volume management information 200 of a disk 904 indicated next by a disk ID 301. Namely, a volume configuration ID 401 coincident with the volume configuration ID 303 acquired in the step 603 is found out of the volume configuration information 400. Then, the head position information 402, unused (area) capacity describing position 403 and total capacity describing position 404 corresponding to the found volume configuration ID are obtained and by using the two pieces of information, values of unused (area) capacity 202 and total capacity 203 are acquired from the volume management information 200.

For example, when the disk ID 301 is "1", the head position information 402 corresponding to a value of "1" of the volume configuration ID 401 is "4 bytes". In addition, the unused (area) capacity describing position 403 is "(4 bytes)" and the total capacity describing position 404 is "(8 bytes)". Accordingly, the unused (area) capacity 202 is acquired from a position which is further shifted by 4 bytes from a position (start position of volume management information 200) which is indicated by a pointer described at 4 bytes spaced from the head of the disk 904 for which the disk ID 301 is "1" and similarly, a total capacity 203 is acquired from a position which is 8 bytes shifted from the start position of volume management information 200 (step 604).

Further, access frequency information of the disk 904 indicated by the disk ID 301 is acquired (step 605).

Pieces of information acquired in the steps 604 and 605 are output to the volume management information extracted data 500 (step 606).

A disk ID to be processed next is acquired from the volume designation information 300 (step 607). Then, for all disk ID's to be processed in the manner as above, the process covering the steps 602 through 607 is repeated.

[Other Embodiments]

In the foregoing embodiments, the invention is carried out in such a way that data needed by the management program is extracted from the volume management information stored in the disk. Alternatively, start and end points of the volume management information may be designated in order that the whole of the volume management information can be output. In this case, the whole of the volume management information 200 is stored in the volume management information extracted data 500.

Then, in such an instance as above, the volume management information is not output as a whole but a difference from the preceding output may be output.

The management information is embodied as having three kinds of information of volume unused (area) capacity, total capacity and access frequency but in addition thereto, volume allocation information by computer, RAID emulation type and frequency of erroneous I/O write in unit of disk may be conceivable.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising a plurality of host computers, a managing computer, and a disk subsystem accessible as logical volumes from said host computer through one or more networks, said disk subsystem comprising:

disk units;

a disk controller coupled to said disk units;

an agent including a supervisory program for performing disk unit resource supervision;

a CPU; and a memory, wherein said CPU executes said agent to collect volume management information held by said disk units and to create logical volume configuration information in said memory, and wherein said memory holds the logical volume configuration information created by execution of the agent such that said managing computer can access information extracted from the volume management information based on said logical volume configuration information.

2. A computer system according to claim 1, wherein said plurality of host computers is coupled to said disk subsystem through a storage area network (SAN) as one of said networks, and said managing computer and said plurality of host computers are coupled to said disk subsystem through a local area network (LAN) as another of said networks, and wherein said agent including the supervisory program for performing disk unit resource supervision collects volume management information of volumes installed in the disk subsystem, the volume management information including volume designation information for designating a volume which delivers management information, and collects volume configuration information describing a method for referencing the volume.

3. A computer system according to claim 2, wherein said volume designation information has a table of which includes volume identification, whether information collection is to be performed on a particular volume, and a volume configuration identification, and said volume management information includes volume identification, an unused volume capacity, and a total volume capacity.

4. A computer system according to claim 1,
wherein the supervisory program provides the volume management information as volume management information extracted data to an area provided on a memory of a service processor based on at least two kinds of information including volume designation information and volume configuration information, and
wherein the volume management information extracted data includes information regarding an unused storage area capacity, a total storage area capacity and an access frequency per disk unit, and is transmitted to the managing computer in response to a request from the managing computer though a local area network (LAN) as one of said networks.

5. A storage managing method in a disk subsystem including disk storages accessible as logical volumes from a plurality of host computers through a storage area network (SAN), said disk subsystem being connected to a managing computer coupled to said host computers via a local area network (LAN), the method comprising the steps of:

using a program for performing disk storage resource supervision, said program including a supervisory program, said program collecting volume management information of volumes installed in the disk subsystem, the volume management information including volume designation information for designating a volume which delivers management information, and volume configuration information describing a method for referencing the volume;

reading the volume management information held in said disk storages;

forming information representing a configuration of logical volumes from said volume management information;

executing said reading step and said forming step in the above order;

creating volume management information extracted data based on said logical volume configuration information;

transmitting the extracted data to said managing computer; and executing said creating step and said transmitting step after execution of said reading step and said forming step.

6. A storage managing method according to claim 5, wherein the volume management information extracted data includes information regarding an unused storage area capacity, a total storage area capacity, and an access frequency per disk unit, and is transmitted to the managing computer in response to a request from the managing computer though the LAN.

7. A management program for managing volumes of a disk subsystem having a disk storage accessible as logical volumes from a computer through a network, said management program being retained in a storage medium and being executable by a CPU for implementing:

a function of reading volume management information held in said disk storage;

a function of forming logical volume configuration information from said volume management information;

a function of extracting information from the volume management information based on said logical volume configuration information; and a function of transmitting the extracted information to a managing computer connected to said network, wherein the function of extracting information from the volume management information and the function of transmitting the extracted information are performed after the function of reading and the function of forming.

* * * * *